Figure 3:
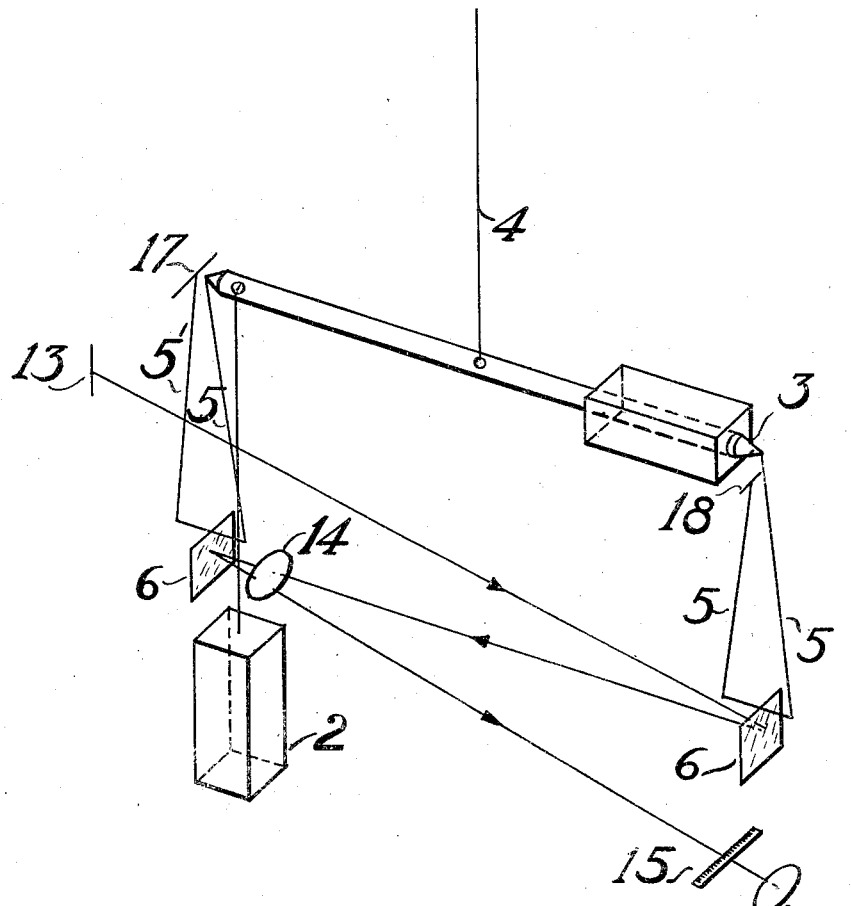

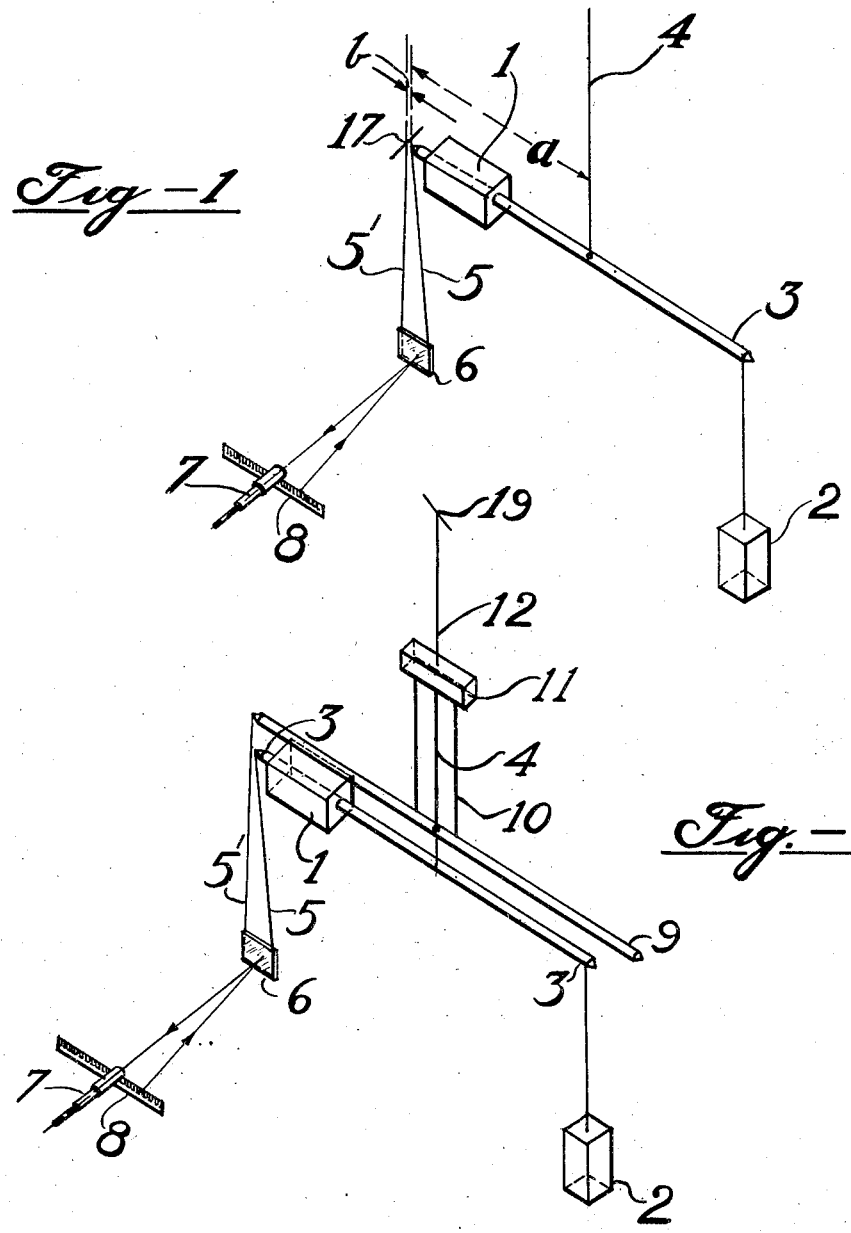

May 31, 1932.   L. W. BLAU   1,861,229
TORSION BALANCE
Filed Aug. 15, 1929   3 Sheets-Sheet 2

INVENTOR
Ludwig W. Blau
BY
ATTORNEY

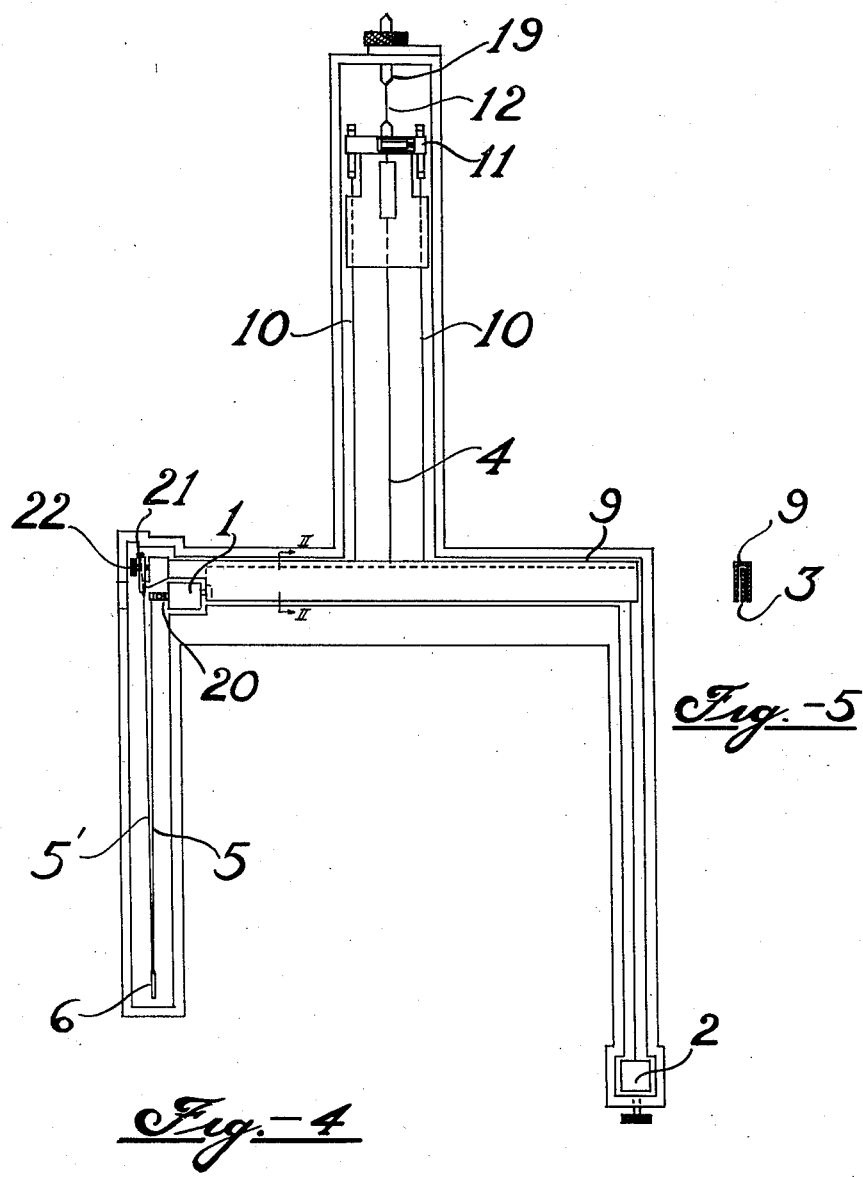

Patented May 31, 1932

1,861,229

UNITED STATES PATENT OFFICE

LUDWIG W. BLAU, OF HOUSTON, TEXAS, ASSIGNOR TO STANDARD OIL DEVELOPMENT COMPANY

TORSION BALANCE

Application filed August 15, 1929. Serial No. 386,183.

This invention relates to a new and improved instrument for the measurement of gravity gradients. This instrument is in effect a short-period torsion balance, which permits one to obtain the data necessary in gravitational work with greater rapidity and accuracy than has heretofore been possible.

As known to those skilled in the art of geophysical measurements the torsion balance consists in principle of a balance beam carrying equal masses on both ends and suspended at the centre by means of a very fine torsion wire. One mass is attached directly to one end of the balance beam while the other mass is suspended by means of a thin filament from the other end. A small mirror at the center of the beam makes possible the reading of the angle through which the beam of the torsion balance is deflected due to unbalanced gravitational forces. From a number of such measurements made at several points of a territory, subterranean irregularities can be located.

My invention comprises the application to the torsion balance of the Kelvin bifilar suspension mirror instead of the usual mirror at the centre of the balance beam, whereby the practical applicability of the torsion balance is greatly increased. One object of my invention is considerably to reduce the time of a reading.

Another object is to increase the reliability of the instrument by shortening the time during which temperature changes or other disturbing causes may influence the exactness of the reading. Still other objects will become apparent in the course of the following description.

The nature of the invention will be more readily comprehended if reference is made to the accompanying figures, in which similar parts are designated by identical numbers. These figures are diagrammatic representations of the various forms of the invention. In Fig. 1 is shown the most simple application of the Kelvin bifilar suspension mirror to a torsion balance. Fig. 2 shows an instrument embodying an auxiliary beam; the latter renders the accurate leveling of the torsion balance unnecessary. In Fig. 3 is shown an instrument employing two Kelvin bifilar suspension mirrors. Fig. 4 is a side view partly in section of an apparatus built according to the modification of the invention shown diagrammatically in Fig. 2 and showing the casing diagrammatically. Fig. 5 is a vertical section through the beam along line II—II of Fig. 4.

The angle through which the beam of a torsion balance is deflected due to gravitational attraction is proportional to the square of the period of the balance. In order to obtain readable deflections it has been necessary, heretofore, to employ instruments having periods of about twenty minutes; thus the time required for one observation is about forty minutes. It is known to those familiar with the art that extraordinary measures are necessary to secure reliable data on account of the effects of temperature changes and other disturbing causes which often become of considerable magnitude in the course of forty minutes. Furthermore, since at least three, and preferably four or five, readings must be obtained at each station, the time required to obtain the necessary data at any one station is at least two, and in practice four, hours. The torsion balances embodying the improvements herein described will yield all the necessary data at any one station in not over fifteen minutes. It is easily seen, then, that an instrument which permits the data being obtained in a small fraction of the time heretofore necessary would also be less likely to be influenced by disturbing factors and would, therefore, permit of attaining considerably increased accuracy.

Since any reduction of the period of the balance results in a decrease of the angular deflection of the instrument, it is necessary to magnify the deflection to such an extent that it will, nevertheless, be readable. I have employed the Kelvin bifilar suspension mirror to obtain such requisite magnification.

The simplest method of application, and the one which best illustrates the principle, is shown in Fig. 1. The two masses 1 and 2 are shown attached in any of the usual ways to the beam 3, which in turn is suspended by means of the torsion wire 4 from a suitable clamp (not shown) attached to the upper extremity of the balance case. A mirror 6 is suspended by means of two wires or fibers 5, 5' from the end of the beam and from a support respectively. The balance case itself may serve as support and the wire 5' may be attached to a point 17 of the case, directly opposite the end of the beam. The deflection of the mirror is read by means of the telescope 7 and scale 8. The magnification obtained being inversely proportional to the distance between the two fibers or wires 5, 5' at the top, the magnification can be made very great by making this distance very small. The angular deflection of the mirror 6 is, in fact, as many times greater than that of the beam 3, as the distance $a$, the half length of the beam, is greater than the distance $b$, between the fibers at the top. Thus if $a$ is 150 millimeters, a common value, and $b$ is 0.5 millimeters which can be easily attained, the angular deflection of the beam is multiplied three hundred times. Since the angular deflection of the beam is read by a telescope and scale in the present balance, then, if the deflection of mirror 6 were read with the same accuracy, the accuracy of reading of the new balance would be three hundred times that of the old. Further, since the period can, as indicated above, be reduced in the ratio of the square root of three hundred to unity, the period can be made about one-seventeenth as long.

It should be noticed that the magnification, and hence the sensitiveness, of the balance is readily adjustable to suit changing requirements arising in gravitational work by simply varying the distance between the mirror suspension fibers at the top.

It is known to those familiar with the theory of the torsion balance that it is necessary to take readings in from three to six positions at each station, depending on whether one balance is employed or two instruments are mounted in the same case; the balance is rotated through a certain angle for each position from the preceding one. Since one of the suspension mirror fibers is attached to the balance case and since it is absolutely necessary that the beam and the case be accurately in the same position, relatively to each other, for all readings at the same station, it becomes very essential with this form of my invention that the balance be set up accurately level. This may be accomplished by using leveling screws and sensitive levels or by suspending the balance from a tripod and damping out any oscillations which might be set up about a vertical axis by means of a damping liquid or by means of any other appropriate damping device.

Fig. 2 shows an arrangement which does not require accurate leveling of the instrument. In this case, one of the mirror suspension fibers or wires is attached to the end of an auxiliary beam 9, 9 instead of to the case as in Fig. 1. This auxiliary beam is suspended by means of two phosphor-bronze ribbons, wires or the like, 10, 10 from a clamp 11 which in turn is hung from a point 19 of the balance case by a wire 12. The torsion wire 4 is attached to clamp 11. The clamp 11 permits the rotation of the beam 9 in a horizontal plane independent of the beam 3 by a suitable arrangement. The distance between the mirror suspensions at the top may be adjusted by means of an appropriate screw at the end of the auxiliary beam. The two beams being hung from the same point, they are always in the same position relative to each other, thus assuring a definite constant zero position of the mirror for all positions of the balance at the same station.

In the torsion balance illustrated in Figs. 4 and 5, the balance beam 3 is of rectangular cross section and is arranged inside the hollow auxiliary beam 9. There is only about one millimeter clearance between the two beams to increase the damping; this is sufficient for the horizontal oscillations, because in a short period balance the deflections are necessarily very small. At that end of the beam where the upper weight 1 is attached to the beam 3, the sides of the auxiliary beam 9 are cut away. At this end of beam 3 is an adjusting screw 20 which is used for adjusting the mirror so that it will deflect the light from the scale into the telescope. At the end of the auxiliary beam 9 is a needle 21 which serves the same purpose. At this end there is also a screw 22 by means of which the two fibers may be separated or arranged closer together to decrease or increase the magnification of the deflection.

In Fig. 3 is shown another arrangement intended to avoid the necessity for very accurate leveling. This employs two bifilar suspension mirror systems, one at each end of the balance beam 3. The mirror suspensions are attached to the beam and to the points 17 and 18 of the balance case, respectively, at each end but in such a way that any rotation of the beam causes the mirrors to rotate in opposite directions. Any translatory motion of the beam leaves the relative positions of the mirrors unchanged. Light from a slit source 13 is reflected from one of the mirrors and passes through the lens 14 to the other mirror. After reflection from this mirror a real image of the slit 13 is formed by the lens on the scale 15 where it is observed by means of the eyepiece 16. The sensitiveness of this instrument is also readily adjustable by varying the distances between the mirror suspensions at the top.

By reason of the compensating effect explained above, this form of instrument does not need to be leveled with so much accuracy as that shown in Fig. 1. Such leveling as is necessary may be done either by accurate levels, in the customary way, or by suspending the whole balance, as with the form of Fig. 1.

The double Kelvin bifilar suspension mirror system described in Fig. 3 is readily applicable also to the auxiliary beam type described in Fig. 2.

Other modifications of the use of the Kelvin bifilar suspension mirror system on torsion balances are within the scope of my invention, and since they all employ the same combination and accomplish the same result, I claim them as a part of this invention.

I claim:

1. In combination with the balance beam of a torsion balance of the type used in gravitational measurements, a support, a suspension mirror, a filament suspending the mirror from the balance beam, a second filament suspending the mirror from said support, whereby the mirror is oscillatorily rotated by the balance beam when said beam is rotated.

2. The apparatus according to claim 1, in which a plurality of mirrors are provided, filaments being suspended from the balance beam and supported in such a manner that two of the mirrors are rotated in opposite directions by the balance beam when said beam is rotated.

3. In combination with the case and the balance beam of a torsion balance of the type used in gravitational measurements, a clamp, means suspending said clamp from a point at the top of the case, an auxiliary beam, means for attaching said auxiliary beam to the clamp, a torsion wire suspending the balance beam from the clamp, a mirror, a filament suspending the mirror from the balance beam, a second filament suspending the mirror from the auxiliary beam, whereby the mirror is oscillatorily rotated by the balance beam when said balance beam is rotated.

LUDWIG W. BLAU.